Jan. 3, 1967   E. V. BARBASHEV ET AL   3,296,470
LIQUID COOLING OF GENERATOR ROTOR WINDINGS
Filed Feb. 3, 1964   3 Sheets-Sheet 1
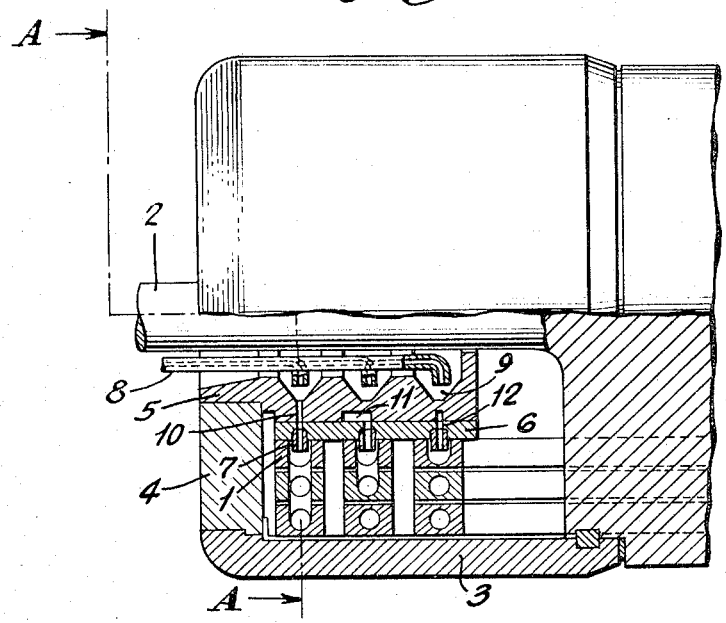
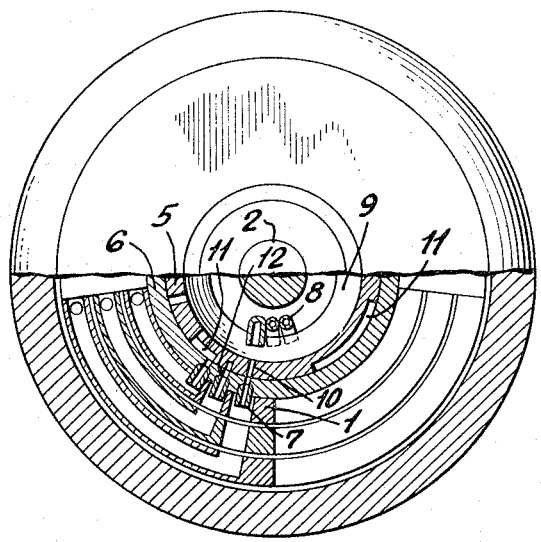
INVENTORS
E. V. BARBASHEV
L. A. JUDITSKAJA
V. F. VOROBJEV
ATTORNEYS

INVENTORS
E. V. BARBASHEV
L. A. JUDITSKAJA
V. F. VOROBJEV

BY *Hancock, Downing & Seebold*
ATTORNEYS

INVENTORS
E. V. BARBASHEV
L. A. JUDITSKAJA
V. F. VOROBJEV

United States Patent Office 3,296,470
Patented Jan. 3, 1967

3,296,470
LIQUID COOLING OF GENERATOR ROTOR WINDINGS
Eduard Valentinovich Barbashev, Lubov Alexandrovna Juditskaja, and Valentin Fedorovich Vorobjev, Moscow, U.S.S.R., assignors to Vsesouzny Nauchno-Issledoratelsky Institute Elecktromekhaniki, Moscow, U.S.S.R.
Filed Feb. 3, 1964, Ser. No. 341,964
7 Claims. (Cl. 310—54)

The present invention relates to the cooling of electrical machines, and more exactly the invention relates to cooling of a turbogenerator rotor, particularly to evaporation cooling of a turbogenerator rotor having a winding consisting of hollow-conductors.

It is well known that at the present time direct cooling of a turbogenerator rotor (internal cooling) is used. The cooling agents are, mainly, hydrogen and water.

In the known arrangements of direct liquid cooling of a turbogenerator rotor, the liquid is fed to the centre of the shaft and, under the action of centrifugal forces, is distributed to the coils of the winding, completely filling the winding ducts. Here, the main disadvantage is seen in the necessity of using packing and pressure facilities at the input of the rotor winding while bringing the cooling liquid to the centre of a revolving rotor. Besides, centrifugal forces develop high pressures, in water feeding channels which requires an increased strength of water-distributing pipes and special sealing of joints.

The direct evaporation cooling of a rotor with hollow-conductor windings has several advantages as compared to purely liquid cooling.

Since in this cooling system the internal surface of the conductors is covered by a thin layer of liquid, with other conditions being equal, the liquid consumption is 10 times less than that in purely liquid cooling.

Evaporation cooling also provides for a high heat emission factor of $$5 \times 10^3 \text{ to } 20 \times 10^3 \frac{\text{large calories}}{\text{sq. m. hr.-degrees}}$$

and a considerably lower liquid circulation rate than that with purely liquid cooling, which rate can be very low (0.5 to 1 m./sec.). However, attempts at effecting direct evaporation cooling of hollow conductors in the rotors of electrical machines by using a two-phase cooling medium did not yield positive results.

It has been proposed in Russian Patent No. 143,105 published in the Bulletin of Inventions No. 231,961 to effect the direct evaporation cooling by feeding the cooling liquid to separate turns of the turbogenerator rotor winding, rather than to the whole coil, as is practiced in the known systems of liquid cooling. For this purpose it was proposed to install a hollow cylinder on the turbogenerator shaft and direct a free jet of cooling liquid into the cylinder from which it is distributed, under the action of centrifugal force, to the turns of the rotor winding.

In this way a thin, continuously moving layer of liquid can be obtained in the water feeding system and in the ducts, in which pressures developed by centrifugal forces are negligible.

In this arrangement cooling liquid is delivered as a free jet (by gravity) to the receiving hollow cylinder, fixed under the end windings and rotating together with the shaft and the liquid is not fed from the centre of the shaft. Under the action of centrifugal forces the liquid is distributed through holes in the cylinder to the semi-turns of the rotor winding.

However, cooling of the turbogenerator rotor by this method involves a number of practical difficulties, which are to be overcome by the present invention.

The primary object of this invention is to provide an effective system of direct evaporation cooling of the rotors of electrical machines, such as turbogenerators, and providing for the feeding of cooling liquid to the rotating winding in a uniform layer along the individual semi-turns of the winding.

Another object of the invention is to permit utilising the existing direct gas systems of cooling with the axial system of ventilation, while individually distributing the cooling medium in parallel to all the semi-turns.

Still another object of the invention is to provide a constructionally simple device for feeding cooling liquid to the rotating rotor of a turbogenerator without requiring the use of packing and pressure facilities at the input of the rotor winding.

Still another object of the invention is to provide for location of the entire device in the gap between the shaft and the end portions of the rotor winding which is 100 to 150 mm. in machines rated at 100,000 kw.

Still another object of the invention is to provide for simple control of cooling liquid consumption along the coils, depending upon the losses.

In accordance with the above mentioned and other objects of the invention a new device and combination of its parts and portions is proposed; said device is intended for feeding cooling liquid to one side of the end windings of the rotor and for further distribution of said liquid along hollow turns or ducts in the body of the rotor, and discharging steam or liquid from the other side of the end portions of the rotor winding.

For a better understanding of the invention by those skilled in the art, a detailed description of the device is provided below in connection with the accompanying drawings, in which FIG. 1 is a schematic longitudinal section of the lower portion of the device for feeding cooling liquid into the hollow conductors of a turbogenerator rotor winding;

FIG. 2 is a cross sectional view of the lower portion of the proposed device taken along the line A—A of FIG. 1;

Figure 3:
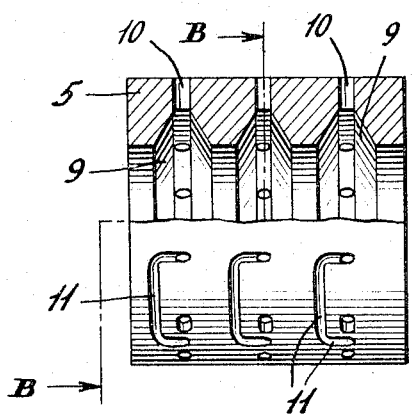
FIG. 3 is a longitudinal section of the upper portion of the hollow receiving cylinder.

The device for feeding cooling liquid to hollow conductors 1 of the turbogenerator rotor winding is installed in the space between shaft 2 and the end portions of the winding in such a way that said end portions lie on the external surface of the device, while between shaft 2 and the internal surface of the device a free space is left.

To provide for a circular clearance between shaft 2 and thrust ring 4, end turn retaining ring 3 is set onto the rotor barrel.

The device for feeding cooling liquid can be secured on shaft 2 or on thrust ring 4. It consists of hollow receiving cylinder or sleeve 5, locking insulating cylinder 6, nipples 7 fixed in cylinder or sleeve 6, and pipes 8 for feeding liquid to hollow cylinder 5.

Figure 4:
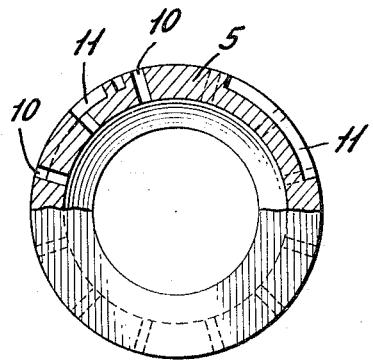
FIG. 4 is a cross section of the upper portion of the receiving cylinder taken along the line B—B of FIG. 3.
Figure 5:
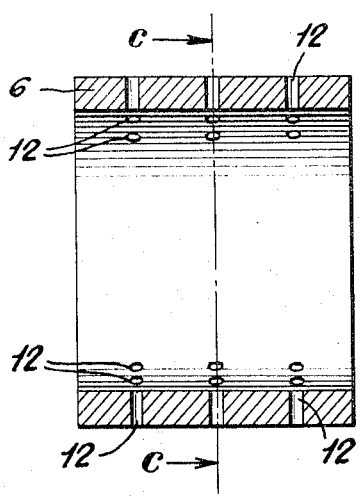
FIG. 5 is a longitudinal section of the locking insulating cylinder of the device.
Figure 6:
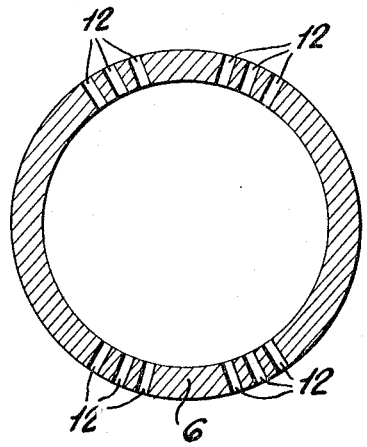
FIG. 6 is a cross sectional view of the insulating cylinder taken along the line C—C of FIG. 5.

The hollow receiving cylinder 5 has circular grooves 9 on its internal surface corresponding to the number of coils of one pole for the reception of cooling liquid from stationary pipes 8. Evenly spaced along the circumference of cylinder 5 are radial holes 10 communicating with grooves 9, the number of holes 10 being equal to the quadrupled number of turns in one coil, to uniformly distribute cooling liquid to the turns. Provided on the external surface of cylinder 5 are slots 11 (FIGS. 3 and 4). After the locking insulating cylinder or sleeve 6 (FIGS. 5 and 6) with holes 12 located against the inlet holes of coil semi-turns in the region of the end windings, is fitted onto holow cylinder 5, grooves 11 on the external surface of hollow cylinder 5 form ducts through which cooling liquid enters from hollow cylinder 5 through uniformly spaced holes 10 to holes 12 in the locking insulating cylinder 6.

These same ducts for feeding cooling liquid from the hollow cylinder through holes 10 to holes 12 in the locking cylinder 6 may be formed in a different way.

Figure 7:
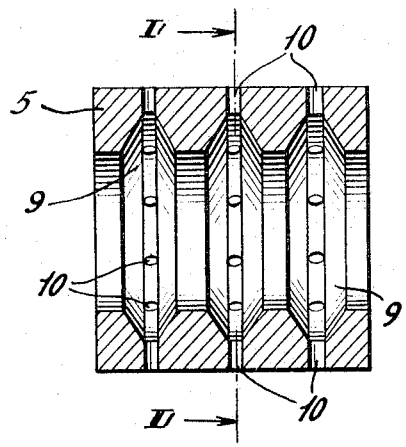
FIG. 7 is a longitudinal section of the hollow receiving cylinder (one of the possible embodiments of the invention)
Figure 8:
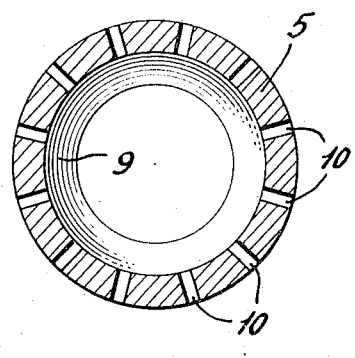
FIG. 8 is a cross sectional view of the receiving cylinder taken along the line D—D of FIG. 7.
Figure 9:
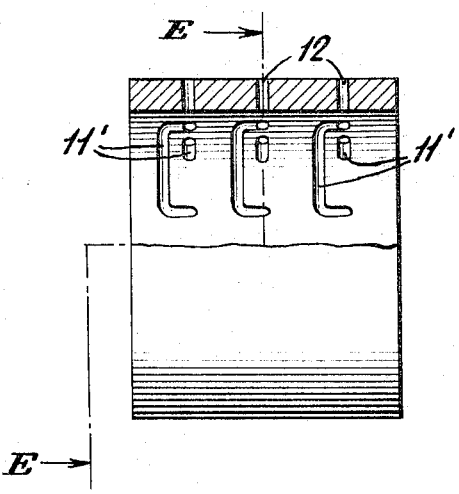
FIG. 9 is a longitudinal section of the upper portion of the locking insulating cylinder (one of the possible embodiments of the invention)
Figure 10:
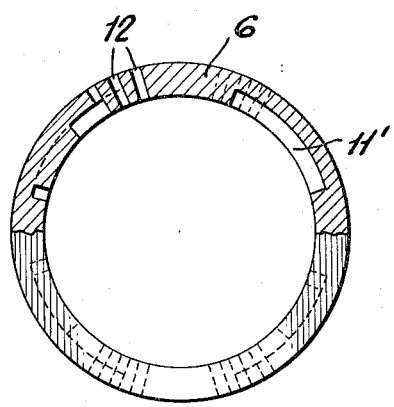
FIG. 10 is a cross sectional view of the upper portion of the insulating cylinder taken along the line E—E of FIG. 9.

In another possible embodiment of the invention shown in FIGS. 7 and 8 hollow cylinder 5 has no grooves in its external surface. In this case grooves 11' are provided in the internal surface of the locking insulating cylinder 6 (FIGS. 9 and 10). After cylinder 6 is fitted onto hollow cylinder 5, shown in FIGS. 7 and 8, slots 11' on the internal surface of the locking cylinder 6 (FIGS. 9 and 10) form ducts through which cooling liquid enters from cylinder 5 through uniformly spaced holes 10 to holes 12 in the locking cylinder 6.

From holes 12 in the locking insulating cylinder 6 liquid flows through nipples 7, fixed in the locking insulating cylinder 6 and enters the semi-turns of the field coils. All nipples 7 are inserted in the holes of the lower turns of each coil. The diameter of the inlet hole of a turn is greater than that of nipple 7, which provides for a gap between the nipple and the inlet hole of the turn.

Such a gap precludes mechanical damage to nipple 7 resulting from shifting of winding turns as the result of heating.

Cooling liquid is delivered individually to each groove 9 of the cylinder 5 via stationary pipes 8, located in the lower part of the space between shaft 2 and cylinder 5.

The number of pipes 8 corresponds to the number of circular grooves 9 on the inner surface of cylinder 5.

In order to ensure that the free jets of liquid flow into the respective circular grooves 9, the ends of water feeding pipes 8 project into said grooves.

Circular grooves 9 of hollow cylinder 5, together with individual stationary pipes 8, make it possible to control feeding of cooling liquid along individual coils depending upon losses, while holes 10, uniformly arranged along the circumference in grooves 9, make it possible to uniformly distribute cooling liquid along separate semi-turns of each field coil. The depth of the grooves 9 serves to limit the maximum quanity of liquid supplied to the holes 10, since any liquid in excess of the capacity of the grooves will simply flow axially out of the cylinder 5.

The device for feeding cooling liquid to the hollow conductors of the turbogenerator rotor winding operates in the following manner.

Cooling liquid is fed by gravity (in a free jet) through stationary pipes 8 into circular grooves 9 of hollow cylinder 5. Under the action of centrifugal forces, created by the rotating rotor, a film of cooling liquid, is formed in each groove 9 which uniformly feeds each hole 10 in groove 9. Then cooling liquid, through the ducts and nipples 7, enters hollow conductors 1 of the semi-turns of each field coil, where it forms a thin boiling layer, which provides for rapid dissipation of heat from the conductors.

The proposed construction of the device for feeding cooling liquid makes it possible to direct the liquid not only into the hollow conductors of the rotor but also into the axial ducts in the rotor body.

It is expedient to use the proposed device in the rotors of large and medium machines, such as tubogenerators, because the overall dimensions of these machines allow shaft and the end windings of the rotor.

The present invention provides for simplified feeding of cooling liquid to the rotor of the turbogenerator; it serves to eliminate complex packing and pressure devices at the input of the rotor winding; it facilitates modification of a rotor construction with direct gas cooling to a construction with direct evaporation cooling; it makes it possible, owing to the utilization of a system of stationary water feeding pipes located in the gap between the shaft and the said cylinder for feeding the cooling liquid to the receiving rotating cylinder, to easily control the flow of cooling liquid along the coils depending upon the losses in them.

The direct evaporation system of cooling the rotor winding makes it possible to considerably increase the current density in the winding and, owing to this, to increase the power for the same size, while maintaining a permissible temperature for the electrical machines, this temperature being substantially equal to the boiling temperature of the cooling liquid.

It will be understood that different changes may be made in the construction and arrangement without departing from the scope of the invention, which is defined in the appended claims.

We claim:

1. In an electrical machine including a rotor mounted on a shaft, windings on said rotor, each winding comprising a hollow conductor having end turns adjacent one end of said rotor and spaced radially outwardly from said shaft, means for supplying a cooling liquid to each end turn, said means comprising a hollow cylinder fixed on said rotor between the end turns and said shaft and with the inner surface of said cylinder spaced radially outwardly from said shaft, insulating means disposed between the outer surface of said cyinder and the end turns, said cylinder having an annular groove in the inner surface, means providing communication between said groove at the bottom thereof and each of said end turns, and a stationary pipe disposed in the space between said shaft and said cylinder for supplying cooling liquid in a free jet to said groove, whereby upon rotation of said rotor centrifugal force causes liquid to flow from said groove through said end turns, the depth of said grooves serving to limit the maximum quantity of liquid supplied to said end turns.

2. An electrical machine as defined in claim 1 in which said cylinder is provided with a plurality of axially spaced annular grooves in the inner surface, means providing communication between each groove at the bottom thereof and the end turn located radially outwardly therefrom, and a separate stationary pipe for supplying cooling liquid in a free jet to each groove, the depth of each groove serving to limit the maximum quantity of liquid supplied to the end turn located radially outwardly therefrom.

3. An electrical machine as defined in claim 1 in which said insulating means comprises a sleeve of insulating material disposed between said cylinder and the end turns.

4. An electrical machine as defined in claim 3 in which said cylinder is provided with radial openings extending outwardly from said groove to its outer surface and said sleeve is provided with radial openings extending from the interior thereof to the outer surface communicating with the openings of said cylinder and said openings in said cylinder and sleeve constituting said communication providing means, and nipples projecting radially outwardly from the openings in said sleeve, said nipples projecting into said end turns.

5. An electrical machine as defined in claim 4 in which the outer surface of said cylinder is provided with a plurality of grooves, said last named grooves constituting ducts for the flow of cooling fluid between certain of the openings in said cylinder and certain of the openings in said sleeve.

6. An electrical machine as defined in claim 4 in which the inner surface of said sleeve is provided with a plurality of grooves, said last named grooves constituting ducts for the flow of cooling fluid between certain of the openings in said cylinder and certain of the openings in said sleeve.

7. In an electrical machine including a rotor mounted on a shaft, windings on said rotor, each winding comprising a hollow conductor having end turns adjacent one end of said rotor and spaced radially outwardly from said shaft, means for supplying a cooling liquid to each end turn, said means comprising a hollow cylinder fixed on said rotor between the end turns and said shaft and with the inner surface of said cylinder spaced radially outwardly from said shaft, said cylinder having an annular groove in the inner surface, means providing communication between said groove at the bottom thereof and each of said end turns, and a stationary pipe disposed in the space between said shaft and said cylinder for supplying cooling liquid in a free jet to said groove, whereby upon rotation of said rotor centrifugal force causes liquid to flow from said groove through said end turns, the depth of said groove serving to limit the maximum quantity of liquid supplied to said end turns.

References Cited by the Examiner

UNITED STATES PATENTS

| 3,034,003 | 5/1962 | Seidner | 310—64 |
| 3,097,317 | 7/1963 | Fechheimer | 310—54 |
| 3,131,321 | 4/1964 | Gibbs et al. | 310—64 |

MILTON O. HIRSHFIELD, *Primary Examiner.*

ORIS L. RADER, *Examiner.*

L. L. SMITH, *Assistant Examiner.*